April 9, 1929.　　　W. F. BENTE　　　1,708,649
JACK TRANSFER
Filed Feb. 11, 1926
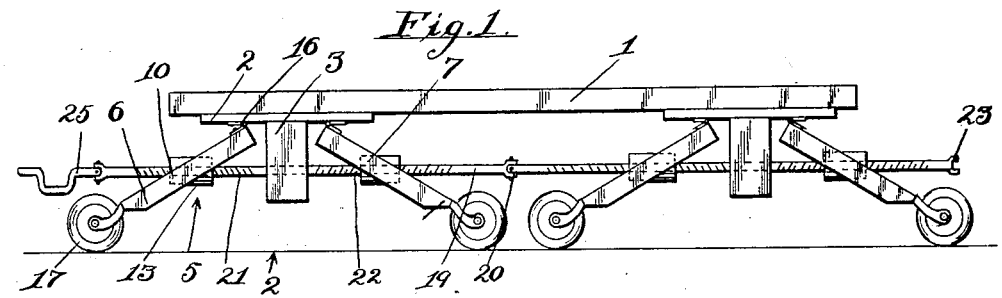
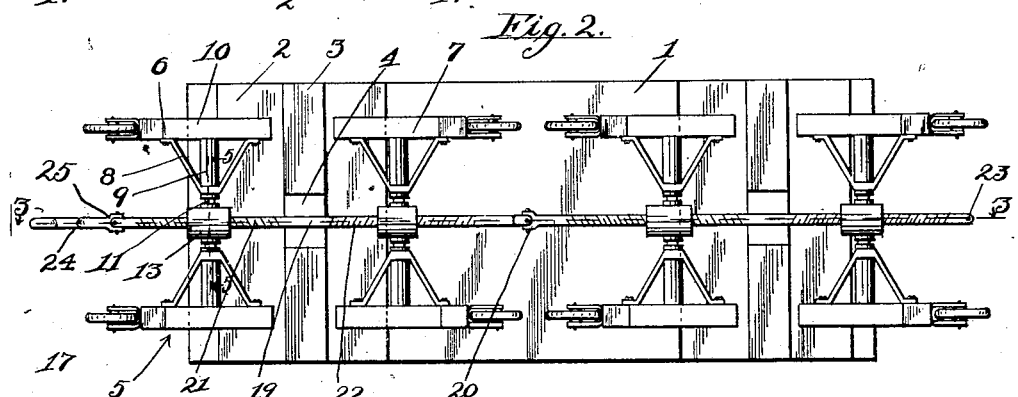
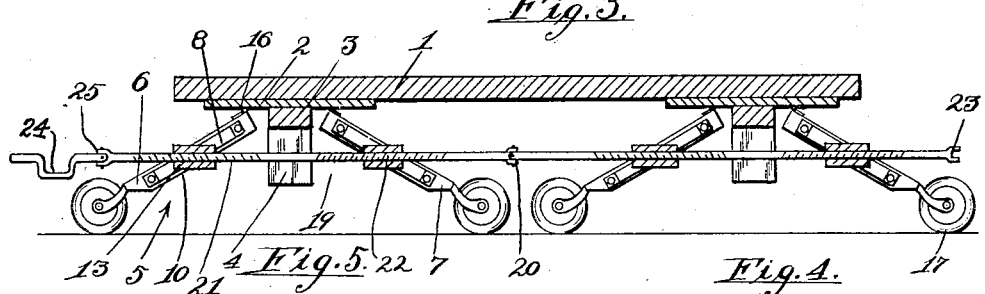
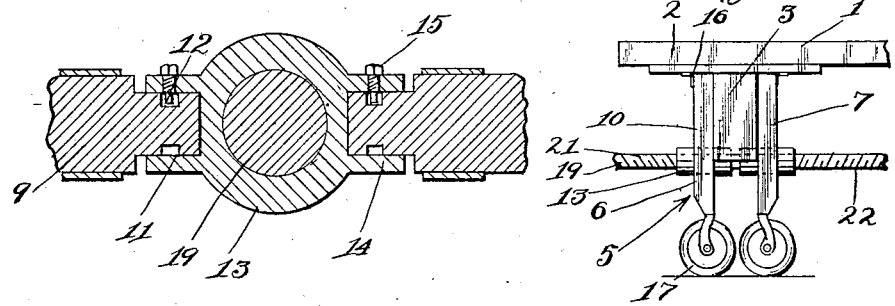
Inventor
William F. Bente
by Hazard and Miller
Attorneys Patented Apr. 9, 1929.

1,708,649

UNITED STATES PATENT OFFICE.

WILLIAM F. BENTE, OF LOS ANGELES, CALIFORNIA.

JACK TRANSFER.

Application filed February 11, 1926. Serial No. 87,719.

My invention is a jack which is adapted to be placed underneath loads and jacked up to raise the same, at the same time forming a transfer truck when elevated.

An object of my invention is a transfer truck having a jacking arrangement whereby after the truck in a lowered position has been placed underneath a load, it may be raised, thereby lifting the load which may be transported on the truck.

A further object of my invention is forming the truck with a plurality of pairs of legs which are mounted to be drawn together, the legs of each pair having wheels on their lower ends whereby on drawing the legs of each pair together the wheels draw towards each other, thus raising the truck.

A further feature of my invention is in mounting the pairs of legs with wheels thereon, each pair to be drawn together from a lowered position of the truck with the wheels wide apart to an elevated position of the truck with the wheels relatively close together, the legs being in a substantially vertical position when the truck is fully elevated and the legs being braced by blocks depending from the truck body.

In constructing my invention I utilize a substantially platform construction for the truck body and secure a pair of legs at the front and rear ends of the truck, these legs having wheels on opposite sides of the truck. A screw passed underneath the platform is connected to the legs by a swivelled nut so that on revolving the screw, by means of right and left hand threads, the nuts are drawn towards or from each other, thus either drawing together each pair of legs or separating the same. Blocks are secured to the lower part of the platform and adapted to engage the legs when they are drawn to their innermost position with the legs substantially vertical and the platform in its highest position.

My invention will be more readily understood from the following description and drawings, in which;

Figure 1 is a side elevation of my transfer jack shown in a partly elevated position.

Fig. 2 is a bottom view as taken in the direction of the arrow 2 of Fig. 1.

Fig. 3 is a vertical longitudinal section as taken on the line 3—3 of Fig. 2.

Fig. 4 is a detail elevation showing a pair of the legs in their innermost position with the truck fully elevated.

Fig. 5 is a detail cross section on the line 5—5, illustrating the mounting of the swivelling nuts.

The frame of the truck is substantially as follows, having reference particularly to Figs. 1, 2 and 3:

A platform 1 which may be of any suitable character has bearing plates 2 secured underneath the same and with blocks 3 forming feet depending downwardly from the plates. These blocks have an open space 4 to accommodate the operating screw as hereafter set forth.

The main details of the running gear are substantially as follows, having reference particularly to Figs. 1 to 4:

The forward and rearward ends of the truck have a pair of leg assemblies 5, each assembly having a forward leg 6 and a rearward leg 7. These leg frames are of substantial construction having diagonal braces 8 engaging draw rods 9. These braces and draw rods are secured to the side members 10 of the leg frames and the draw rods preferably have reduced ends 11 with annular grooves 12 therein connected by a substantial nut 13 having sockets 14 on opposite sides with set screws 15 or the like extending into the annular grooves.

The leg frames are secured to the bearing plates by hinges 16 and each of the side members 10 is provided with a running wheel 17 preferably being of the caster type and mounted to swivel in the lower end of the side members.

The operating mechanism for the jack features of my truck comprises a screw 19 having a universal joint 20 and formed with opposite threads such as right and left threads 21 and 22 on each portion of the screw, the screw being threaded through the nut 13. A yoke 23 is formed on opposite ends of the screw to attach a crank 24 by means of an inter-connecting yoke 25, thus forming a universal joint.

The manner of using my truck is substantially as follows:

It will be obvious that by turning the crank in one direction that the nuts 13 may be drawn towards or from each other for each pair of legs, thereby moving the leg frames from a position as shown in Figs. 1 and 3, with the wheels wide apart to the position shown in Fig. 4 with the wheels together and the platform raised to its highest position In order to prevent the platform from being lowered to such an extent that it would be difficult to draw the legs together on account of the obtuse angle between the same, the blocks 3 may act as feet on which the platform may rest when in its extreme lowest position. These blocks also form a back brace for the legs when they are drawn together in the position of Fig. 4 with the legs vertical and backed by the blocks 3. It is not necessary to raise the platform to its full extent unless this is desired as the load may be transported with the leg frames in any suitable position so long as the blocks 3 are raised above the ground. The truck may be drawn or moved by any suitable means, preferably being drawn directly by engagement with the platform or by pulling or shoving on the screw 19. On account of the wheels being of a caster type and swivelled the truck may be turned in a very short space.

Although my truck is of a simple character, and is shown having a large platform intended to carry large loads, nevertheless it will be obvious that small trucks merely having one pair of leg frames could be utilized with a screw threaded device to draw these legs into a vertical position as shown in Fig. 4.

It will be noted in regard to my invention that when the legs are in the vertical position, as shown in Fig. 4, that there is a square abutment between the upper ends of the legs and the lower face of the bearing plate 2. Therefore there is practically no strain on the hinges due to the weight of the load.

It is therefore apparent that my jack transfer may be considerably changed in general construction and in specific details without departing from the spirit thereof as set forth in the description, drawings and claims.

Having described my invention, what I claim is:

1. A jack transfer having a platform with a plurality of leg assemblies, such assemblies each comprising a pair of straight non-jointed legs pivotally connected to the platform to hinge outwardly in opposite directions, wheels on the lower ends of the legs, a block positioned between each pair of legs, said blocks forming feet to support the platform when in its lower-most position, and means to move each pair of legs to elevate the platform or to lower same, each pair of legs when the platform is raised to the fullest extent engaging a block on opposite sides.

2. A jack transfer comprising in combination, a platform, a pair of straight non-jointed leg assemblies, each assembly having two pairs of legs hingedly connected to the platform to hinge outwardly in opposite directions, each of the legs having a wheel at its lower end, a swivel nut between each pair of legs, a screw extending through the said nuts, blocks secured to the platform between each pair of legs, the blocks forming an abutment against which opposite pairs of legs engage when the platform is raised to its upper-most position, the blocks also forming feet to support the platform when in its lower-most position.

3. A jack transfer comprising in combination, a platform having a plurality of blocks extending downwardly therefrom, said blocks forming feet to support the platform in its lower-most position, a plurality of non-jointed side members having wheels at their lower ends pivotally connected to the platform on opposite sides of each of the blocks, draw rods extending from each of the side members towards the center line of the platform and having a nut swiveled to each pair of draw rods, a screw extending through each of the nuts, diagonal braces extending from the draw rods to each of the side members, the blocks forming abutments for opposite side members when the platform is in its upper-most position.

In testimony whereof I have signed my name to this specification.

WM. F. BENTE.